United States Patent [19]

Habfast et al.

[11] Patent Number: 5,043,575
[45] Date of Patent: Aug. 27, 1991

[54] PROCESS FOR THE MASS-SPECTROMETRIC INVESTIGATION OF ISOTOPES, AS WELL AS ISOTOPE MASS SPECTROMETER

[75] Inventors: Karleugen Habfast; Hans-Jörg Laue, both of Bremen, Fed. Rep. of Germany

[73] Assignee: Finnigan Mat GmbH, Bremen, Fed. Rep. of Germany

[21] Appl. No.: 480,472

[22] Filed: Feb. 14, 1990

[30] Foreign Application Priority Data

Feb. 23, 1989 [DE] Fed. Rep. of Germany ....... 3905631

[51] Int. Cl.$^5$ .................... B01D 59/44; H01J 49/00
[52] U.S. Cl. .................................. 250/283; 250/282; 250/296
[58] Field of Search ............... 250/281, 282, 283, 284, 250/296, 292

[56] References Cited

U.S. PATENT DOCUMENTS

| | | | |
|---|---|---|---|
| 3,080,754 | 3/1963 | Johnson | 250/283 |
| 3,786,249 | 1/1974 | Ambar | 250/283 |
| 3,885,155 | 5/1975 | Ambar | 250/283 |
| 3,950,641 | 4/1976 | Evans et al. | 250/283 |
| 4,234,791 | 11/1980 | Enke et al. | 250/284 |
| 4,536,652 | 8/1985 | Cooks et al. | 250/282 |

FOREIGN PATENT DOCUMENTS

| | | |
|---|---|---|
| 0225717 | 6/1987 | European Pat. Off. . |
| 0237259 | 9/1987 | European Pat. Off. . |
| 2134739 | 1/1986 | Fed. Rep. of Germany . |
| 7031654 | 7/1972 | France . |
| 1225430 | 3/1971 | United Kingdom . |
| 1410315 | 10/1975 | United Kingdom . |
| 1549219 | 7/1979 | United Kingdom . |
| 1558828 | 1/1980 | United Kingdom . |
| 2129607 | 5/1984 | United Kingdom . |
| 2133924 | 8/1984 | United Kingdom . |

OTHER PUBLICATIONS

"A New Filter Supplement for Isotope Ratio Measurements" by H.-J. Laue and H. Wollnik, *International Journal of Mass Spectrometry and Ion Processes*, 84 (1988) 231–241.

"A Variable Geometry Multipocket Collector for Electromagnetic Sector Separators" by Rudolf Wagner, *Nuclear Instruments and Methods*, 139 (1976) 73–78.

"A New 'Hybrid' Sector/Quadrupole Mass Spectrometer for Mass Spectrometry/Mass Spectrometry" by G. L. Glish, S. A. McLuckey, T. Y. Ridley and R. G. Cooks, *Int'l Journal of Mass Spectrometry and Ion Physics*, 41 (1982) 157–177.

Primary Examiner—Bruce C. Anderson
Attorney, Agent, or Firm—Flehr, Hohbach, Test, Albritton & Herbert

[57] ABSTRACT

In isotope mass spectrometry, there is the problem that in the case of very great frequency differences, the less frequent masses are swamped by the more frequent masses in the measurement result or that the corresponding measurement result is falsified. A correction device is proposed, which comprises a quadrupole mass filter with a voltage supply device which is controlled by the ion separation system and is designed in such a manner that the supply voltages of the quadrupole mass filter and thus its characteristic with respect to the mass quantity to be allowed through are switched over synchronously with the varying mass deflection setting of the ion separation system.

19 Claims, 3 Drawing Sheets

PROCESS FOR THE MASS-SPECTROMETRIC INVESTIGATION OF ISOTOPES, AS WELL AS ISOTOPE MASS SPECTROMETER

BACKGROUND OF THE INVENTION

The invention relates to a process for the mass-spectrometric investigation of isotopes, as well as an isotope mass spectrometer.

In a whole series of various sciences, the relative isotope frequencies of individual elements are used in the investigation of substances as indicators for specified set questions. Merely by way of examples, reference is made here to medicine, in which, for example, deuterium is used as a labelling substance and its relative frequency in relation to hydrogen is investigated, or geology, in which the determination of the age of rocks is carried out, for example, by means of a determination of the frequency of specified rubidium and strontium isotopes in the rock. In all cases, the matter of importance is to obtain exact information concerning the frequency of isotopes which differ with respect to their masses only by one single mass unit.

There are now a plurality of systematic error sources, which lead to a situation in which isotopes of a specified mass are attributed, in the course of the mass-spectroscopic investigation, to those which exhibit a different, neighbouring mass (i.e. are falsely recognised). By way of examples of such error sources, reference is made here, only by way of key words, to errors in the inlet system (separation of the masses by their flow velocity in the inlet system, errors in the ion source, separation of the masses by magnetic fields, probability of ionization, vaporization processes etc), errors in the separation system (e.g. homogeneity errors) or also error sources in the ion detection system. It is also possible for measurement errors to occur as a result of interactions between the ions (in the ion source or in the separator) or as a result of collision processes. These errors always act in the form of an incursion onto the neighbour mass; this is designated as abundance sensitivity.

In order to reduce the measurement error, arrangements are now known which exhibit, on the one hand, a sector magnet and, on the other hand, a downstream-situated electrostatic sector field, which serves to mask out ions which have lost energy on account of a scattering process. The incursions onto neighbour masses or abundance sensitivity can be improved, by this, to values of approximately $10^{-7}$.

A further improvement can be achieved by tandem mass spectrometers, in which two sector magnets are disposed one behind the other with oppositely directed deflection. In these arrangements, a pulse-controlled two-fold deflection of the ion curren takes place. The abundance sensitivity which can be achieved amounts to approximately $10^{-12}$.

In both cases, it is therefore necessary to effect a considerable expenditure on apparatus, in order to achieve an improvement of the accuracy of measurement.

OBJECT AND SUMMARY OF INVENTION

The object of the present invention is to develop further the arrangement and process of the initially mentioned type, to the end that a considerable improvement in the accuracy of measurement is achieved by simple means.

In particular in circumstances in which the mass spectrometer operates in scan operation and the quadrupole mass filter is also run in stages, the accuracy of measurement can be improved considerably in relation to the former arrangements, without, in this case, having to alter the scan operation in relation to the former mode of procedure. In particular, indeed, in the case of the tandem mass spectrometers, in which an exact synchronism of the two deflecting units is required, hysteresis problems occur, which permit only a restricted improvement in the accuracy of measurement.

The quadrupole mass filter is preferably operated so that it is held uniformly over the entire scan range on a transmission breadth of one mass unit; this is achieved by a simultaneous alteration of the direct-current voltage and of the superposed alternating-current voltage.

A further advantage of the invention resides in that the quadrupole mass filter is "energy insensitive", so that ions of equal mass which have differing momentum after scattering processes are recognised as equal masses, but, on the other hand, differing masses of equal energies can be separated by the quadrupole mass filter. This is ensured, in particular, in circumstances in which the velocity of the ions entering the quadrupole mass filter is not too large. It must indeed be ensured that the ions (which are to be separated off) have enough time to build up on their path through the quadrupole into unstable trajectories. Preferably, as a result of this, a retardation system is situated upstream of the quadrupole mass filter. This retardation system can advantageously be designed as a quadrupole lens (operation only with direct-current voltage).

DETAILED DESCRIPTION OF PREFERRED EMBODIMENTS

Figure 1:
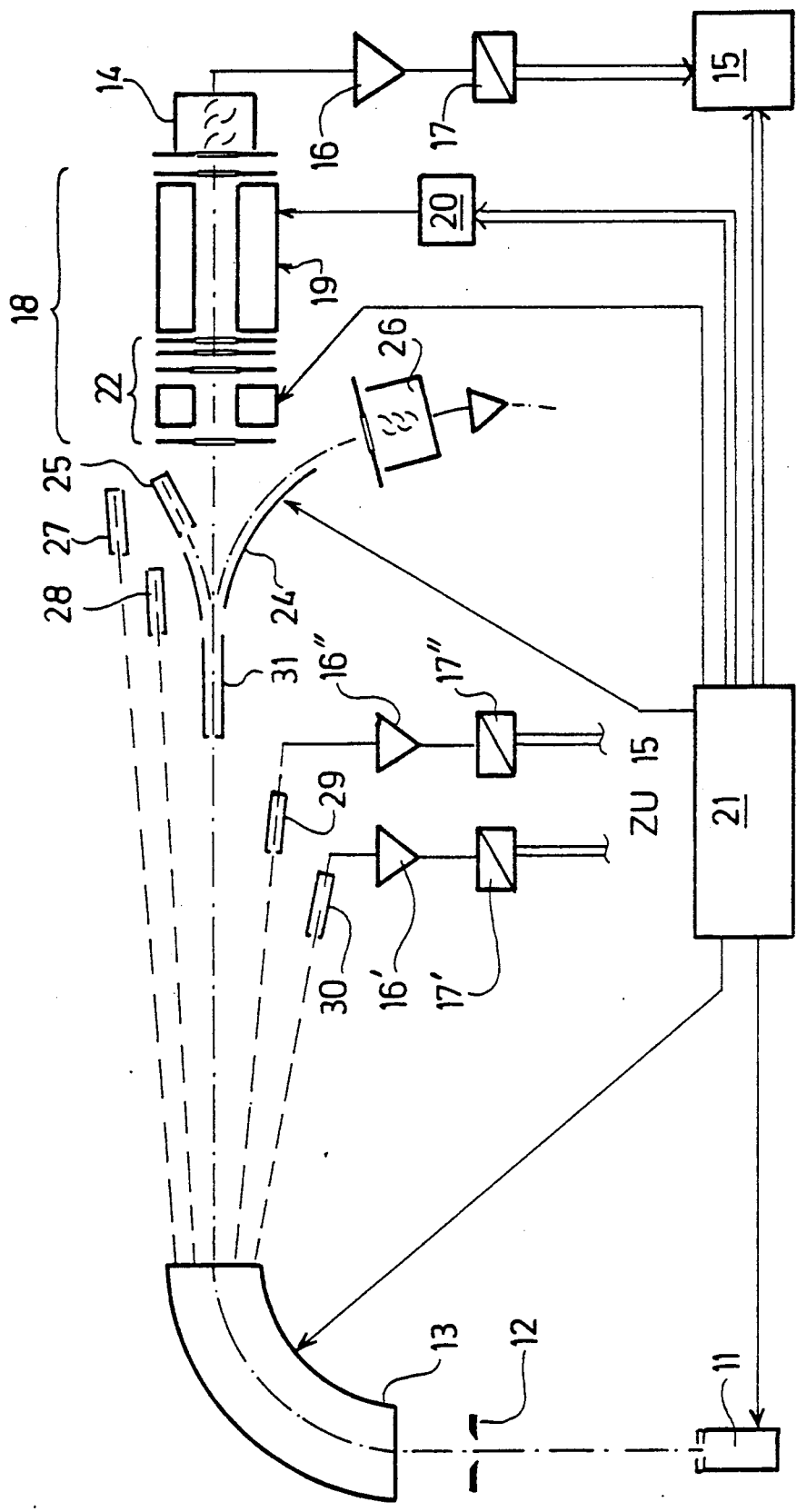
FIG. 1 shows a diagrammatic representation of the entire arrangement of an isotope mass spectrometer according to an embodiment of the invention.

As shown in FIG. 1, the arrangement comprises a static ion separation system 10 (known per se), which comprises an ion source 11, a diaphragm 12 situated downstream of the latter and a sector magnet 13. The ion source 11 and the sector magnet 13 are controlled by means of a control 21 of the ion separation system.

A trapping device is situated downstream of the ion separation system 10. This trapping device comprises a plurality of locally variable Faraday traps 27-30, which form, together with a further trapping device 14 with an upstream-situated correction device 18, a controllable deflecting device 24 situated in front thereof and a gap arrangement 31 arranged in front of the latter, a multi-collector. The ions which pass through the gap arrangement 31 can be supplied by the controllable deflecting device 24 selectively either to a Faraday suspension 25, to an electron multiplier 26 or to the trapping device 14 with the upstream-situated correction device 18. All traps 14 and 25-30 are connected via preamplifiers 16 and A/D converters 17, to a processing unit 15, in which the measurement results can be evaluated.

The correction device 18 comprises an ion retardation device 22 and a downstream-situated quadrupole mass filter 19. The quadrupole mass filter 19 is supplied, via a voltage supply device 20, with a direct-current voltage, on which a high-frequency voltage is superposed. The voltage supply device 20 is controlled by the processing unit 15 simultaneously with the ion separation system 10.

Figure 3:
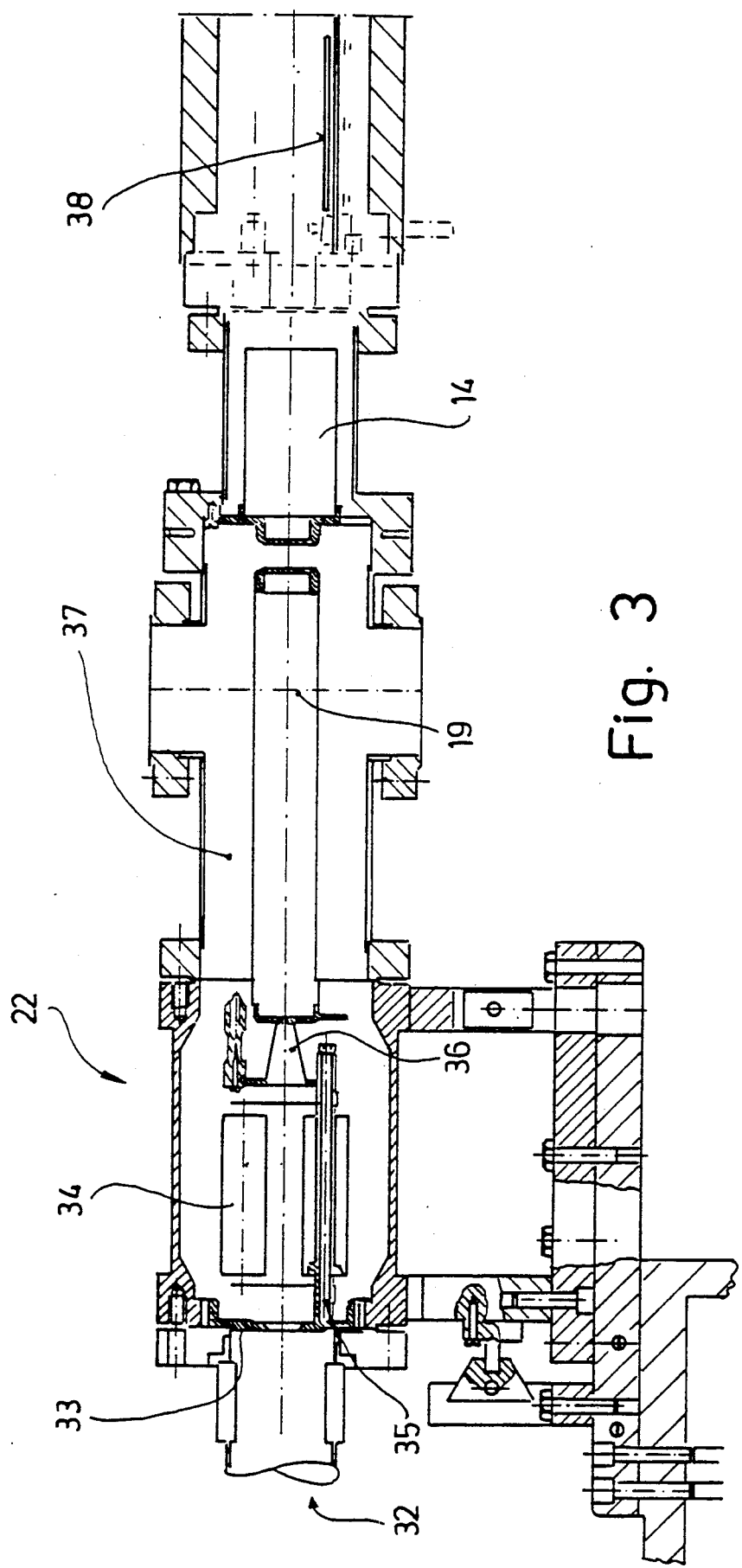
FIG. 3 shows a representation in cross-section through a trapping device with an upstream-connected quadrupole mass filter and a retarding unit situated upstream of the latter.

The unit 18 with the downstream-situated trap 14 is shown more precisely in FIG. 3 and held as a component on a mounting platform. This component comprises an entrance opening 32 for the ions which then enter the ion retardation device 22 through a gap 33. This retardation device comprises rods 34, which are combined into a quadrupole and which are held by means of mountings 35 on the frame of the diaphragm 33. The ions pass out of the ion retardation device 22 via a further diaphragm 36 into the quadrupole mass filter 19, which is flanged onto the retardation device 22 in a housing 37. Situated downstream of the quadrupole housing 37 is the trapping device 14, which comprises a secondary electron multiplier, the electronic counting system 38 of which is fitted behind the trapping device 14.

Figure 2:
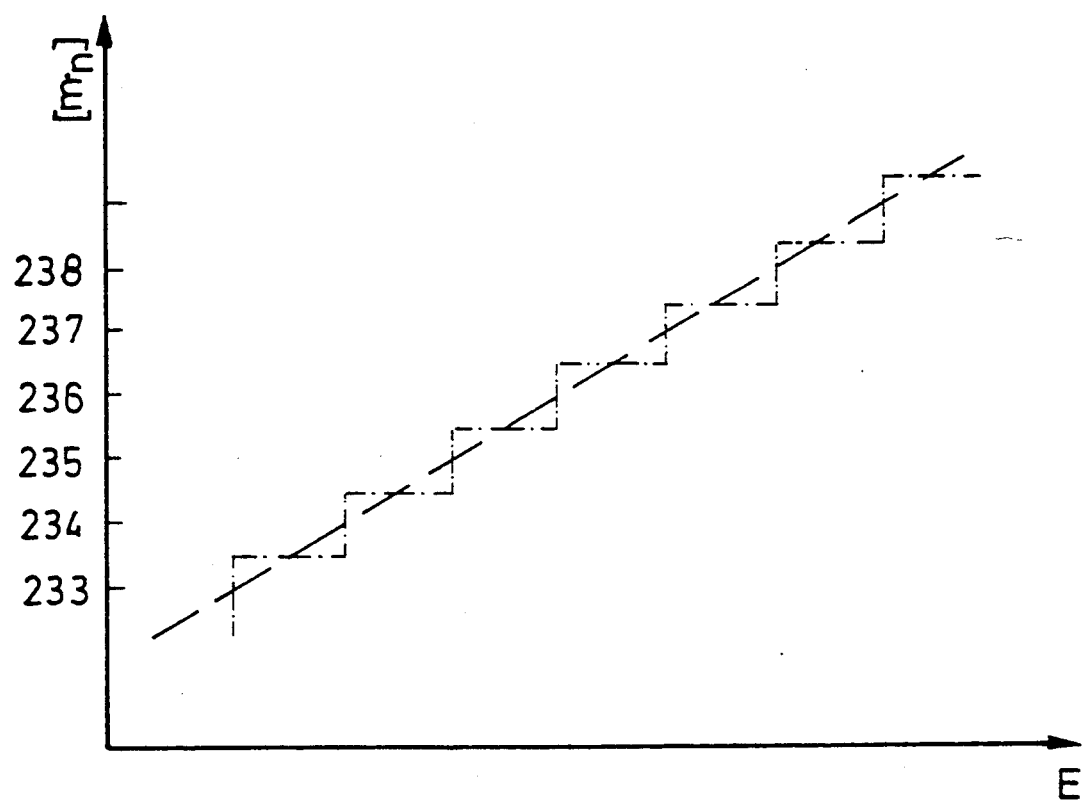
FIG. 2 shows a characteristic to explain the scan operation.

The operation of the arrangement and the process according to the invention are explained in greater detail with reference to FIG. 2 hereinbelow. In this illustration, the broken line shows the curve of the current fed into the sector field magnet, and the dash-double dot line shows the curve of the (combined) supply voltage of the quadrupole mass filter with respect to time. Furthermore, the illustration shows the mass stages, i.e. those masses which, with appropriate setting of the sector field (on this amplitude) would have, in the ideal case, to be the only ones to reach the trapping device 14. As is evident from this illustration, the quadrupole mass filter is always switched over from one mass to the next when the sector field magnet effects a deviation which would have to result in an impingement of ions with a mass situated precisely in the middle between the two masses in the trapping device 14. Thus, while the magnetic field is continuously varied upwards (or downwards) in accordance with a specified scan function, the individual masses are guided past the exit slit of the sector device. This then gives the conventional mass spectrum, which consists of individual peaks. By the additional arrangement of the quadrupole mass filter, which is switched over in stages, it is ensured that in the case of a whole mass m of the mass spectrum, i.e. from m−0.5 to m+0.5, only the mass m and not, for example, the neighbour mass m+1 or m−1, impinges on the trapping device. As a result of this, a considerable improvement is achieved with respect to the blurring of mutually adjacent peaks.

The arrangement of the quadrupole mass filter is of great advantage also in the case of operation of the mass spectrometer in the jumping mode, in which the magnetic field is set in stages successively (rapidly) to at least two mass values and remains constant there for a specified time, in order to count the impinging ions. In particular, it is important here that a rapid switching-over can take place easily in synchronism with the sector magnet.

We claim:

1. A method of mass spectrometry for analyzing isotopes comprising the steps of
generating isotope-ions;
passing said istop-ions through a static separation system for separating isotope-ions of different masses from one another;
passing said isotope-ions from said static separation system through a settable correction device to a trapping device for counting the isotope-ions trapped by said trapping device;
operating said static separation system for deflecting isotope-ions in a scan or jumping mode for guiding said isotope-ions in a scan or jumping mode for guiding said isotope-ions of different masses into said trapping device in a one mass after the other mode;
setting said correction device in accordance with said scan or jumping operation mode of said static separation system for passing, independently of their momentum or their energy, isotope-ions having those masses which correspond in their mass values to the masses which are, at the very moment of time, guided into the trapping device by the static separation system, and for filtering out isotope-ions having different masses.

2. A method according to claim 1, in which isotope-ions are passed through a quadrupole mass filter as a correction device.

3. A method according to claim 2, in which a direct-current and a high-frequency supply voltage source of the quadrupole mass filter are adjusted at the same time for a setting of the correction device such that a filter band-width of masses passing through said correction device is set uniformly to a specified range.

4. A method according to claim 3, in which said range is $(\pm 0.5 \times m_0 + n \times m_0)$, wherein $(n \times m_0)$ is the mass value of the masses which are, at the very moment of time, guided into the trapping device.

5. A method according to claim 1, in which the static separation system is operated in a continuous scan mode and the correction device is operated in steps such that the setting of the correction device is switched over from a passing mass $(n \times m_0)$ to a neighbor mass $((n+1) \times m_0)$ at a mass deflection setting of the static separation system of $(n \times m_0 \pm m_0/2)$.

6. An isotope mass spectrometer comprising:
an ion source for generating isotope ions;
a static separation system for settably separating isotope-ions of different masses from one another being set in one of a continuous scan operation mode or a jumping operation mode;
a settable correction device for passing said isotope-ions from said static separation system to at least one trapping device;
wherein said trapping device generates signals in accordance with trapped isotope-ions, said signals being processed by a central processing unit;
wherein said correction device is settable in accordance with scan or jumping operation mode of said static separation system for passing, independently of their momentum, or their energy, isotope-ions having those masses which correspond in their mass values to the masses which are, at the very moment of time, guided into said trapping device by the static separation system, for filtering out isotope-ions having different masses;
and wherein said correction device comprises a quadrupole mass filter and a voltage supply device which is controlled by said static separation system such that a filter characteristic of said quadrupole mass filter is switched over synchronously with a varying mass deflection setting of the static separation system.

7. An isotope mass spectrometer according to claim 6, in which said voltage supply device switches over the filter characteristics of said quadrupole mass filter steps.

8. An isotope mass spectrometer according to claim 7, in which said steps correspond to one mass unit ($m_0$).

9. An isotope mass spectrometer according to one of claims 7 or 8, in which said steps are arranged symmetrically about a mass deflection setting of the static separation system in a scan operation mode such that a switching over of the filter characteristics of said quadrupole mass filter takes place in accordance with a step switching by one mass unit ($m_0$) with a mass deflection setting of ($n \times m_0/2$) of said static separation system.

10. An isotope mass spectrometer according to claim 7, in which the steps are dimensioned to be equal to a mass deflection setting of said static separation system in a jumping mode.

11. An isotope mass spectrometer according to claim 6, in which said static separation system comprises at least one sector field magnet.

12. An isotope mass spectrometer according to claims 6, further comprising an ion retardation device being located upstream of said quadrupole mass filter.

13. An isotope mass spectrometer according to claim 12, in which said ion retardation device comprises at least one quadrupole lens.

14. An isotope mass spectrometer according to claim 6, in which said at least one trapping device comprises one electron multiplier device.

15. An isotope mass spectrometer according to claim 6, further comprising a controllable deflecting device being located upstream of said trapping device at said quadrupole mass filter for selectively supplying isotope-ions to at least one further trapping device.

16. An isotope mass spectrometer according to claim 15, further comprising a retardation device being located upstream of said quadrupole mass filter.

17. An isotope mass spectrometer according to claim 6, further comprising a plurality of locally settable subsidiary trapping devices for forming a multi-collector system.

18. An isotope mass spectrometer according to claim 17, in which said subsidiary trapping devices are connected with said central processing unit and in which said central processing unit is adapted to calculate ratios between measurement signals for calculating ratios of ion trapping frequencies or ion beam intensities.

19. An isotope mass spectrometer according to claim 17, further comprising diaphragm devices for being mounted upstream of said trapping devices.

* * * * *